United States Patent
Li et al.

(10) Patent No.: US 7,990,176 B2
(45) Date of Patent: Aug. 2, 2011

(54) LOW POWER LINE DRIVER AND METHOD THEREOF

(75) Inventors: Hsin-Hsien Li, Hsin Chu (TW);
Chin-Chun Lin, Hsin Chu (TW);
Tsung-Hsien Hsieh, Hsin Chu (TW);
Zi-Long Huang, Hsin Chu (TW)

(73) Assignee: Ralink Technology Corp., Jhubei (TW)

( * ) Notice: Subject to any disclaimer, the term of this patent is extended or adjusted under 35 U.S.C. 154(b) by 0 days.

(21) Appl. No.: 12/565,339

(22) Filed: Sep. 23, 2009

(65) Prior Publication Data
US 2011/0068831 A1 Mar. 24, 2011

(51) Int. Cl.
*H03K 17/16* (2006.01)
(52) U.S. Cl. ............................... 326/82; 326/21
(58) Field of Classification Search .......... 326/21, 326/26, 27, 30, 82–87
See application file for complete search history.

(56) References Cited

U.S. PATENT DOCUMENTS

| | | | | |
|---|---|---|---|---|
| 3,467,787 A * | 9/1969 | Baade | .......................... | 307/125 |
| 6,812,733 B1 * | 11/2004 | Plasterer et al. | ................ | 326/30 |
| 6,919,742 B1 | 7/2005 | McGlinchey | | |
| 7,019,552 B2 | 3/2006 | Wang et al. | | |
| 7,764,067 B2 * | 7/2010 | Lindsey | ....................... | 324/519 |

* cited by examiner

*Primary Examiner* — Don P Le
(74) *Attorney, Agent, or Firm* — Alston & Bird LLP

(57) ABSTRACT

A line driver for a communications system requiring multiple power sources for different modes of operation comprises a current source and a voltage source coupled in parallel with the current source. The current source has a first terminal and a second terminal. The line driver further comprises a first source resistor coupled to the first terminal of the current source and a second source resistor coupled to the second terminal of the current source. The current source provides a driving current and the voltage source provides a driving voltage at the same time during operations of the communications system.

20 Claims, 5 Drawing Sheets

… (1)

LOW POWER LINE DRIVER AND METHOD THEREOF

TECHNICAL FIELD

The present invention relates to a semiconductor product and method thereof, and more particularly, to a line driver for multiple power-source applications.

BACKGROUND

Many electronic applications operate on multiple power sources. In other words, these applications may operate on one power source in one mode of operation, and then on a different power source in another mode of operation. One example is a personal computer (PC) system. A PC system specifies multiple power sources, or operating voltages, at 12 volts (V), 5 V and 3.3 V for various operations. For instance, the output voltage of a computer system in an idle mode is different from that of the computer system in a fully operational mode.

Another example of a system that operates on multiple power sources is a wireless communications system. In a local area network (LAN), data packets may be transmitted using different technologies. The most widely used LAN technology is the Ethernet. Ethernet has many varieties in speed and physical medium used. The modes of operation in popular commercial application are the 10 Base-T, 100 Base-TX and 1,000 Base-T, run at 10 Mbps, 100 Mbps and 1 Gbps, respectively. Because these modes operate at different voltage levels, a product that supports all three modes of operation must include a driver that is capable of operating and providing at different voltage levels. There are two basic architectural options for the Ethernet drivers: current source or voltage source. Typically, the current source is used for 10Base-T mode of operation and the voltage source is used for 100Base-TX mode of operation. In a multi-mode Ethernet network, therefore, different operating voltages often cause significant power consumption.

Conventional systems provide either a current source or a voltage source during any given mode of operation, believing using only one power source at a time will save power. Specifically, in a 10BaseT mode, only a current source is used and the voltage source is turned off or placed in standby mode wherein no current is output to drive the system. In the 100BaseT mode, only the voltage source is used, and the current source is turned off or placed in standby mode wherein no voltage is output to drive the system. This type of alternating the power source necessarily requires added voltage and current requirements for each mode of operation.

BRIEF DESCRIPTION OF THE DRAWINGS

The embodiments illustrated in the figures of the accompanying drawings herein are by way of example and not by way of limitation. In the drawings.

DETAILED DESCRIPTION

Figure 1:
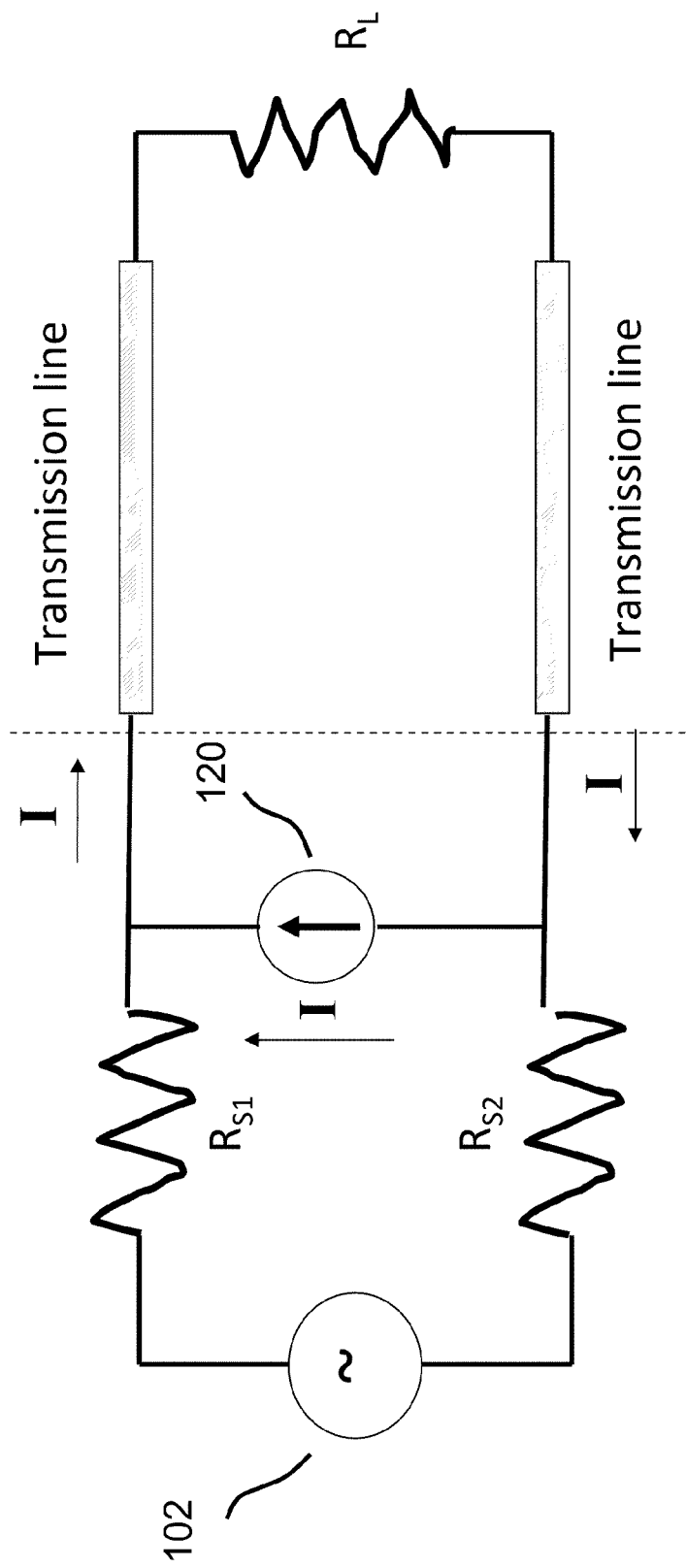
FIG. 1 is a circuit diagram according to one exemplary embodiment of the present invention.

FIG. 1 is a circuit diagram according to one exemplary embodiment of the present invention. Referring to FIG. 1, a line driver (not numbered) comprises a voltage source 102, a current source 120 and source resistors $R_{S1}$ and $R_{S2}$. Resistors $R_S$ represent the source termination impedance. The voltage source 102 is coupled to a first source resistor $R_{S1}$, which is in turn connected to the first terminal (not numbered) of the current source 120. The voltage source 102 is further coupled to a second source resistor $R_{S2}$, at a different terminal from the terminal coupled to the first source resistor $R_{S1}$. The second source resistor $R_{S2}$ is coupled to the second terminal (not numbered) of the current source. In other words, the voltage source 102 is in parallel with the current source 120. For purposes of the present invention, the impedance of the first source resistor is equivalent to that of the second source resistor. A resistor $R_L$ is coupled to the current source 120, through the transmission lines, in parallel, which in turn is coupled to the voltage source 102 in parallel. The resistor $R_L$ represents the load impedance. The system represented by FIG. 1 operates on multiple power sources.

In operation, the source impedance is matched with the impedance of the load. In the telecommunications field, for example, impedance matching is required to reduce signal reflection. However, complete impedance matching may not always be possible due to a variety of factors known to one skilled in the art. In addition, the impedance created by the transmission lines would also create impedance matching issues that should be taken into consideration. Assuming an ideal impedance match, the relationship between $R_S$ and $R_L$ may be represented by the equation $R_L=2R_S$, where $R_{S1}=R_{S2}=R_S$. The system as represented by FIG. 1 is driven both by a voltage source and a current source at the same time, thereby allowing the system to operate at multiple power sources. A current I flows from the current source 120, through the transmission line, to the load resistor $R_L$ and returns to the current source 120, thereby forming a current loop. No significant net current flows from the current source 120 to or from the voltage source 102. In other words, no significant net current flows through source resistors $R_{S1}$ and $R_{S2}$. Thus, there is no power dissipation by either of the source resistor, thereby reducing power consumption of the line driver as compared to conventional line drivers. The operation of the line driver of the present invention will be explained further in detail below.

In a conventional system driven only by a voltage source, for example, the power consumption of that system may be calculated with the formula: $I^2 \times (R_{S1}+R_{S2}+R_L)=I^2 \times 2R_L$, wherein I represents the current. In a conventional system driven only by a current source, the power consumption of that system may be calculated with the formula: $I^2 \times (R_{S1}+R_{S2})+I^2 \times R_L=I^2 \times 2R_L$. In contrast, the power consumption of the system with the line driver of the present invention is approximately $I^2 \times R_L$ because no current flows through the source resistors. The power consumption of the present invention is approximately half of the conventional systems. The power consumptions of the present invention and conventional modes of operation are shown in Table 1.

TABLE 1

|  | Present invention | Conventional current mode | Conventional voltage mode |
|---|---|---|---|
| Power consumption | $I^2 \times R_L$ | $I^2 \times 2R_L$ | $I^2 \times 2R_L$ |

Figure 2:
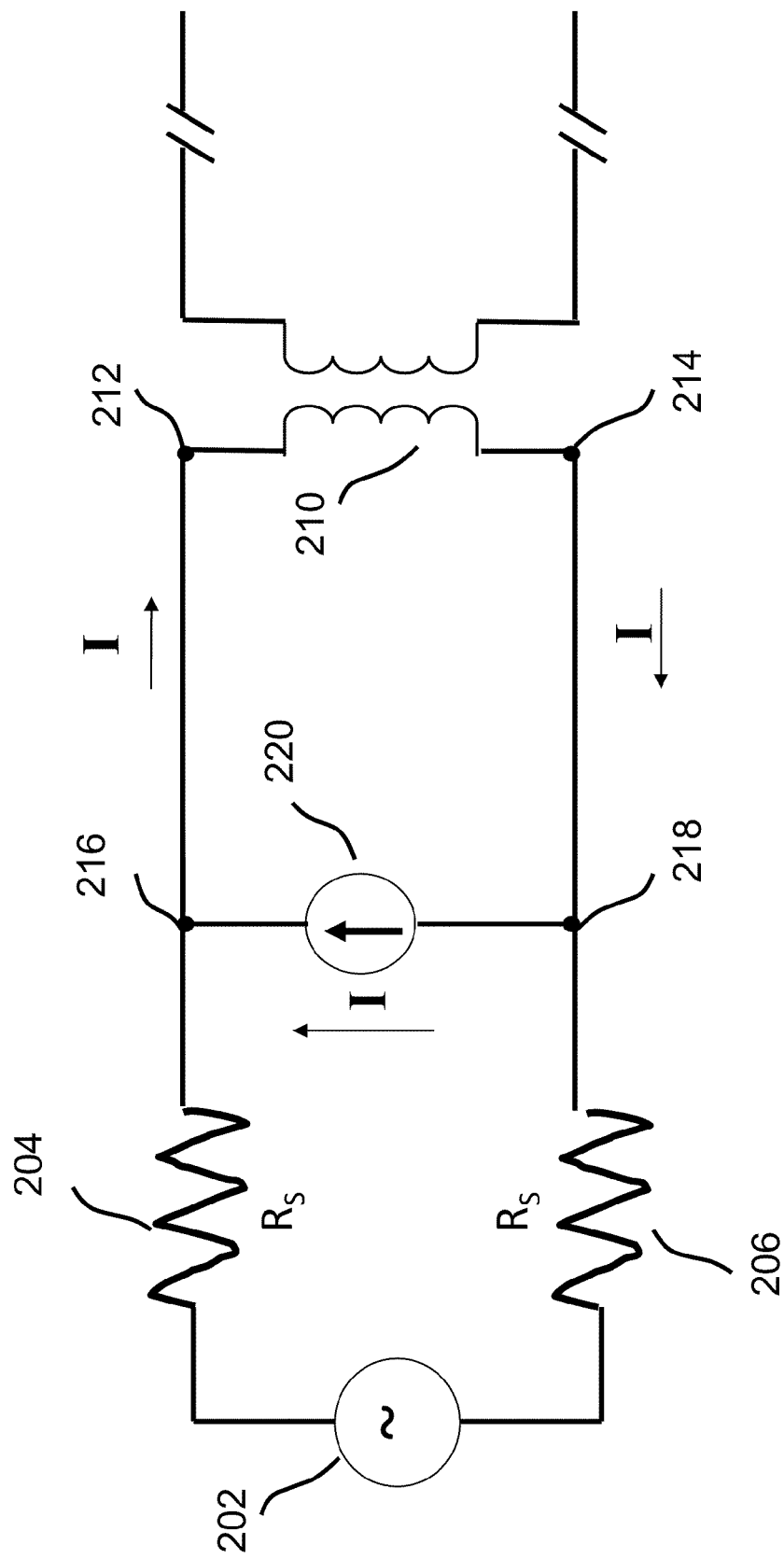
FIG. 2 is a circuit diagram according one exemplary embodiment of the present invention as implemented in an Ethernet system.

FIG. 2 is a circuit diagram according one exemplary embodiment of the present invention as implemented in an Ethernet system. Specifically, the line driver of the present invention comprises both a current source and a voltage source. In operation, regardless of the mode of operation of the Ethernet system, the current source provides a driving current and the voltage source provides a driving voltage at the same time. Referring to FIG. 2, a voltage source 202 is coupled between a pair of source termination impedance, a first source resistor 204 and a second source resistor 206. The voltage source 202 provides a voltage to drive the load impedance, for example, a transformer 210, which is disposed between two output nodes 212 and 214. A current source 220 is disposed between a first node 216 and a second node 218. A driving current I from the current source 220 flows from the current source 220 to the first node 216, the node 212, the transformer 210 and the nodes 214, 218, and return to the current source 220. Again, there is no significant net current flow from the current source 220 to or from the voltage source 202, and therefore is no significant net current flow through the source resistors 204 and 206. As a result, the architecture of the present invention not only simplifies the operating requirements of the Ethernet system, but also consumes less power than Ethernet systems with conventional line drivers.

Figure 3:
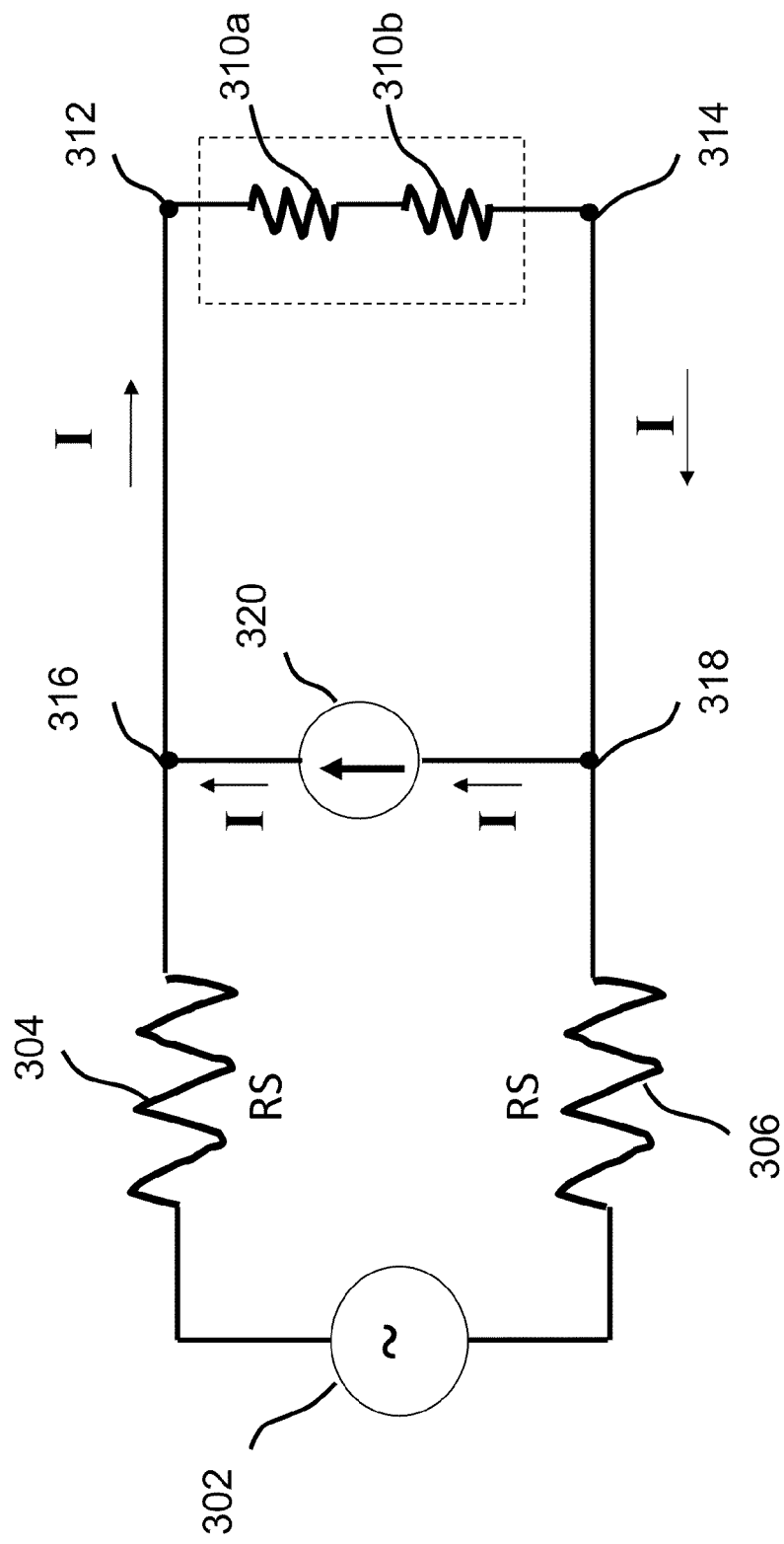
FIG. 3 is the equivalent model of the circuit diagram of FIG. 2.

The improvement in power consumption of the present invention may be better understood by referring to FIG. 3, which is the equivalent model of the circuit diagram of FIG. 2. Referring to FIG. 3, the equivalent model includes both a "voltage driver" with a voltage source 302 and a "current driver" with a current source 320. The load impedance is represented by load resistors 310a and 310b. One skilled in the art understands that the response in any element of a circuit having more than one signal source may be determined from the sum of the responses of the individual contributions from each source. Therefore, the response from each source can be obtained by setting the other sources to zero.

Figure 4C:
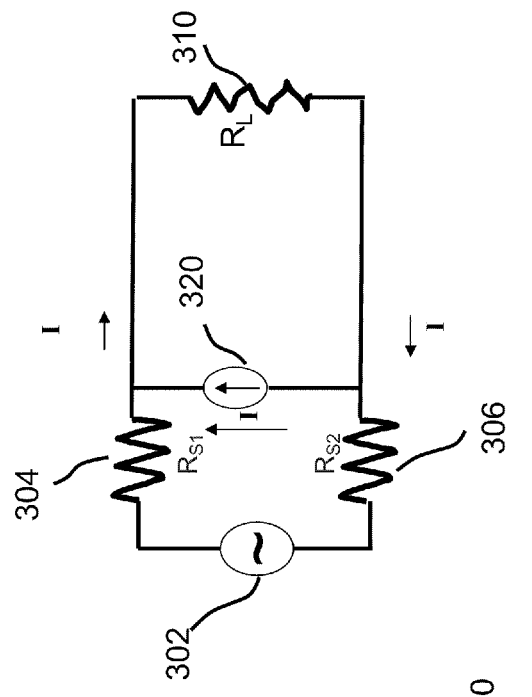
FIG. 4C is an equivalent circuit model of a line driver of the present invention derived from combining FIGS. 4A and 4B.
Figure 4A:
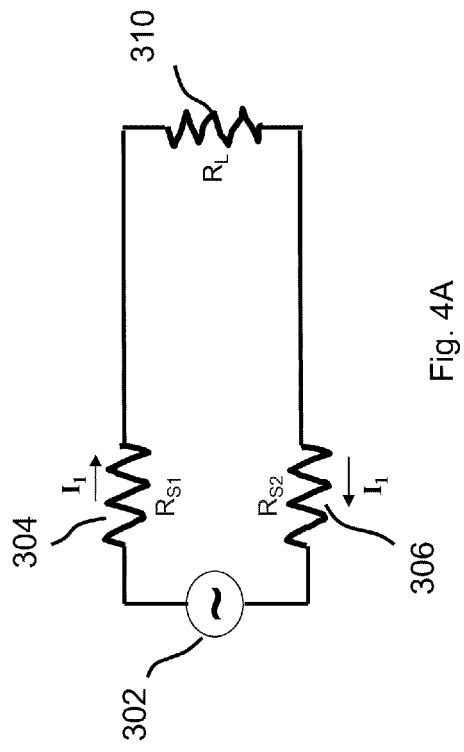
FIG. 4A is an equivalent circuit model of a line driver of the present invention with a single voltage source.

In operation, the current source 320 is viewed by the voltage source 302 as an open circuit because the current source 320 has an infinite resistance that prevents any current from flowing through. Accordingly, an equivalent circuit is shown in FIG. 4A. In this equivalent model, a first current $I_1$ flows from the voltage source 302, through a first source resistor 304, to the load impedance 310, and returns to the voltage source 302 through a second source resistor 306. The direction of current flow (clockwise) and therefore the current is designated as a positive current, whereas a current that flows in the opposite direction (counterclockwise) is designated as a negative current. Accordingly, the first current $I_1$ from the voltage source 302 may be calculated by this formula:

$$\frac{V_{CC}}{RS_1 + R_L + RS_2},$$

a positive current.

Figure 4B:
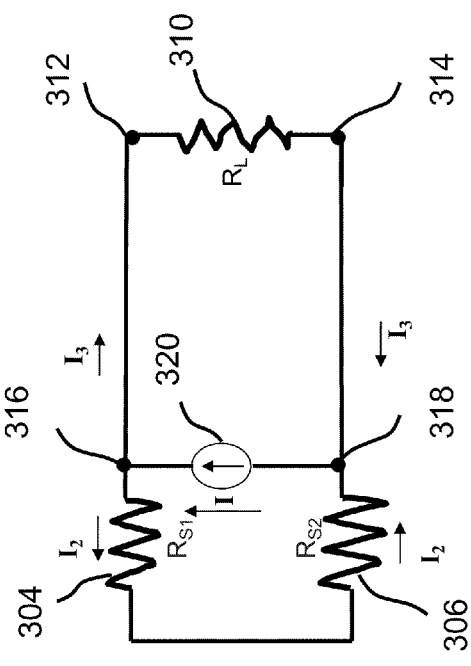
FIG. 4B is an equivalent circuit model of a line driver of the present invention with a single current source.

In contrast, the voltage source 302 is viewed by the current source 320 as a short circuit, meaning a current may flow through it with negligible resistance. An equivalent circuit is shown in FIG. 4B. Referring to FIG. 4B, current derived from the current source 320 is split between the source termination impedance (i.e., the first source resistor 304 and the second source resistor 306) and the load impedance 310. Specifically, a second current $I_2$ flowing from the current source 320 flows through a node 316, the first source resistor 304, the second source resistor 306 and a node 318 in a counterclockwise direction. Therefore, the second current is a "negative" current.

A third current $I_3$ flows from the current source 320 to the node 316, an output node 312, the load impedance 310, an output node 314 and the node 318 in a clockwise direction. Thus, the third current is a "positive" current. When the sum of the first and the second source resistors 304 and 306 is equal to the value of the load impedance 310, as in an impedance matching setup, the current from the current source 320 will be split equally into the second current $I_2$ and third current $I_3$. That is, the absolute values of the second current $I_2$ and the third current $I_3$ are equal to one another, and are equal to one-half of the current I.

In addition, because the response in the resistor 304 equals to the sum of the responses caused by each independent source acting alone, the amount of the current flowing through the source resistor 304 may be determined by subtracting the second current $I_2$ from the first current $I_1$. FIG. 4C is an equivalent circuit of the combination of circuits represented in FIG. 4A and FIG. 4B. As illustrated in FIG. 4C, when the absolute values of the first current $I_1$ and the second current $I_2$ are equal, i.e., $$\frac{V_{CC}}{R_{s1} + R_L + R_{s2}} \times 0.5,$$

and therefore is equal to ½I, the contribution to the current from the voltage source 302 and the current source 320 on the first source resistor 304 is zero because the first current $I_1$ and the second current $I_2$ flow in the opposite direction. The contribution to the current from each source on the second source resistor 306 is also zero for the same reason. Accordingly, no power is dissipated on the first and the second source resistors 304 and 306. The sum of the current through the load impedance 310 is equal to (½I+½I) as the first current $I_1$ flows in the same direction and has a magnitude that is equal to the third current $I_3$. As the result, the power consumption of the system incorporating the line driver of the present invention is $I^2 \times R_L$.

Referring again to FIG. 3, assuming the first and the second source resistors 304 and 306 each has a resistance of 50Ω. Load impedance that comprises two load resistors 310a and 310b disposed in series between two the output nodes 312 and 314. Each of the load resistors 310a and 310b is 50Ω. Ideally, no current flows through the first and the second source resistors 304 and 306 so there is no power consumption. When 3.3V power supply generates 2.4V voltage, the power consumption of the load impedance is $$I^2 \times R_L, \text{ or } \left(\frac{2.4 \text{ V}}{100 \text{ }\Omega} \times 0.5\right)^2 \times 100 \text{ }\Omega.$$

Table 2 shows the power dissipation of the present invention with that of the conventional modes of operation in 10BaseT, 100BaseT+ and 100BaseT Ethernet system. In the Ethernet system, we assume each of the resistors is 50Ω and the load impedance is 100Ω. Power supply $V_{DD}$ is 3.3V. For an Ethernet system with multiple power supplies such as 100BaseT+ mode, high voltage VccH is 3.3V and low voltage VccL is 1.8V. As shown in Table 2, for a 10BaseT Ethernet system, the current I flowing through the load impedance is $$\frac{V_{CC}}{R_L} \times 0.5, \text{ or } \frac{2.4 \text{ V}}{100 \text{ }\Omega} \times 0.5.$$

Accordingly, the line driver of the present invention consumes 39.6 mW of power, or $$I \times V_{DD} = \frac{2.4 \text{ V}}{100 \text{ }\Omega} \times 0.5 \times 3.3 \text{ V}.$$

For 100Base-TX mode of operation, when the generated voltage $V_{cc}$ is 1V, the power consumption of the conventional system is 16.5 mA, or $$\frac{1 \text{ V}}{100 \text{ }\Omega} \times 0.5 \times 3.3 \text{ V}.$$

Figure 5:
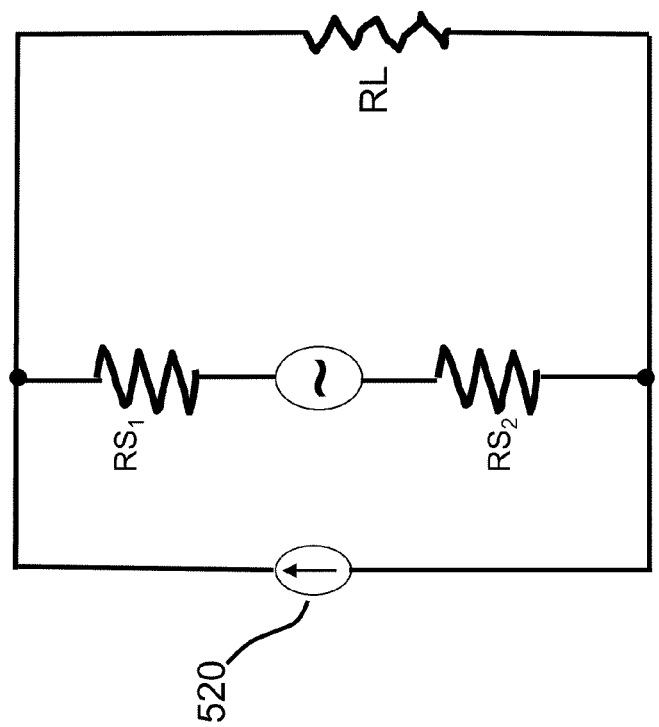
FIG. 5 is a circuit diagram of a conventional circuit having both current and voltage sources.

In contrast, the conventional line driver will consume approximately double that of the line driver of the present invention. As illustrated in a conventional system of FIG. 5, despite the conventional line drivers have both current source and voltage source, only one source is used at any given time. For example, for 10Base-T mode of operation, only the current source 520 is used. The current I from the current source 520 can be calculated by $$\frac{V_{CC}}{R} \times 0.5$$

where R equals to $$\frac{(R_{s1} + R_{s2}) \times R_L}{(R_{s1} + R_{s2}) + R_L}.$$

As the result, the conventional line driver consumes 79.2 mW of power, or $$\frac{2.4 \text{ V}(50 \text{ }\Omega + 50 \text{ }\Omega + 100 \text{ }\Omega)}{(50 \text{ }\Omega + 50 \text{ }\Omega) \times 100 \text{ }\Omega} \times 0.5 \times 3.3 \text{ V}.$$

Figure 6:
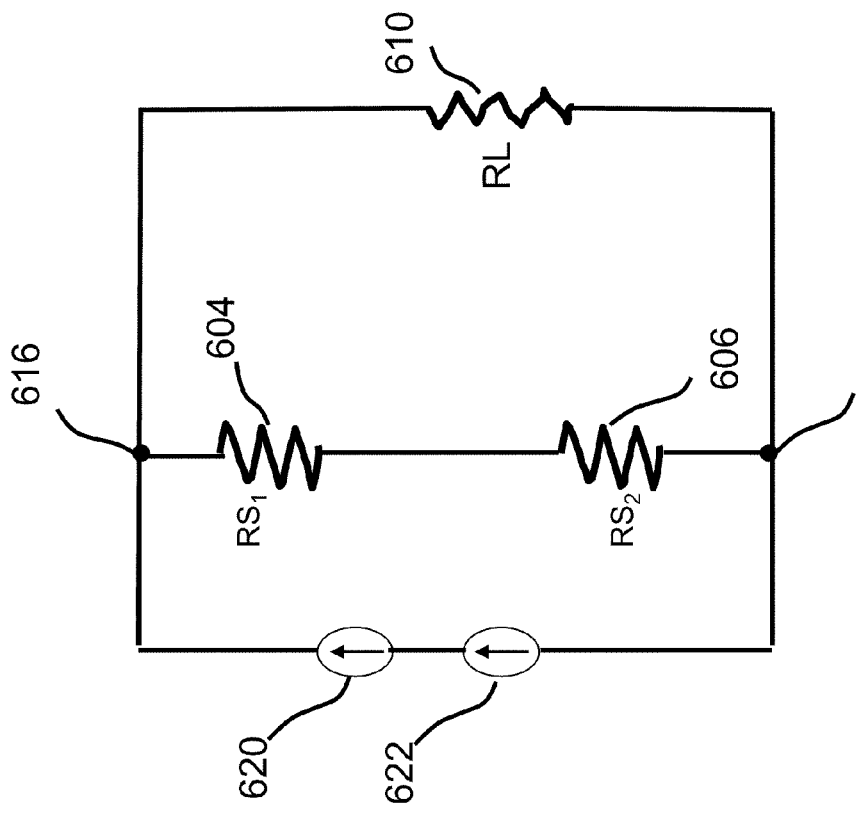
FIG. 6 is a circuit diagram of a conventional circuit having two current sources.

In further contrast, the power consumption of a 10BaseT Ethernet system using a line driver having only a current source, the system consumes more power consumption even though it is using a lower voltage supply of 1.8V. As shown in FIG. 6, a first current source 620 and a second current source 622 are disposed in series between a first node 616 and a second node 618. A first source resistor 604 and a second source resistor 606 disposed in series between the first node 616 and the second node 618 are in parallel with the series of the two current sources 620 and 622. The resistor $R_L$ 610 disposed between the first node 616 and the second node 618 is in parallel with the two source resistors and the two current resources. For 10Base-TX mode of operation, the current I provided by the two current sources is calculated by $$\frac{V_{CC}((R_{s1} + R_{s2}) \times RL)}{(R_{s1} + R_{s2}) + RL}.$$

When the generated voltage $V_{CC}$ is 2.4V, the power consumption will be 86.4 mW, or $$\frac{2.4 \text{ V}((50+50) \times 100)}{50 \text{ }\Omega + 50 \text{ }\Omega + 100 \text{ }\Omega} \times 1.8 \text{ V}.$$

For 100Base-TX mode of operation, the conventional line driver consumes 36 mW of power, or $$\frac{1 \text{ V}((50+50) \times 100)}{50 \text{ }\Omega + 50 \text{ }\Omega + 100 \text{ }\Omega} \times 1.8 \text{ V}$$

when the generated voltage $V_{CC}$ is 1V.

The power saving is more robust for the 100BaseT+ mode. Operating at 1.8V, the line driver of the present invention consumes only 9 mW of power, or $$\frac{1 \text{ V}}{100 \text{ }\Omega} \times 0.5 \times 1.8 \text{ V}$$

when the voltage source and current source are used together. However, in a conventional current mode system, under a low voltage power supply, the entire system consumes 36 mW of power.

TABLE 2

|  | Power consumption of the present invention | Power consumption of conventional line drivers having both current and voltage sources but only one source is used at any given time | Power consumption of conventional line drivers using only a current source |
|---|---|---|---|
| 10 BaseT | 39.6 mW(VDD 3.3 V) | 79.2 mW(VDD 3.3 V) | 86.4 mW(VDD 1.8 V) |
| 100 BaseT | 16.5 mW(VDD 3.3 V) | 16.5 mW(VDD 3.3 V) | 36 mW(VDD 1.8 V) |
| 100 BaseT+ | 9 mW(VccL 1.8 V) | 16.5 mW(VDD 3.3 V) | 36 mW(VDD 1.8 V) |

The present invention also discloses a method for providing a line driver having both a current source and a voltage source that output current and voltage at the same time for a system requiring multiple power sources for its operations. In one exemplary embodiment, the method of the present invention may be implemented in an Ethernet system. Specifically, there is provided a method for driving a system that requires multiple power sources. The method includes providing a current source having a first terminal and a second terminal. The current source provides a driving current. The method further includes providing a first source resistor and coupling the first source resistor to the first terminal of the current source. The method also provides a voltage source coupled in parallel with the current source, to provide a driving voltage, wherein both the driving voltage and the driving current are provided during the operation of the system but no significant driving current flows through the first source resistor.

It will be appreciated by those skilled in the art that changes could be made to the examples described above without departing from the broad inventive concept. It is understood, therefore, that this invention is not limited to the particular examples disclosed, but it is intended to cover modifications within the spirit and scope of the present invention as defined by the appended claims.

What is claimed is:

1. A line driver for a communications system requiring multiple power sources for different modes of operation, comprising:
 a current source having a first terminal and a second terminal;
 a first source resistor coupled to the first terminal of the current source;
 a second source resistor coupled to the second terminal of the current source; and
 a voltage source that, in series combination with the first and second source resistors, is coupled in parallel with the current source,
 wherein the current source provides a driving current and the voltage source provides a driving voltage at the same time during operations of the communications system.

2. The line driver as claimed in claim 1, wherein the communications system is an Ethernet system.

3. The line driver as claimed in claim 2, wherein the driving current and the driving voltage are both provided to the communications system in each of a 10 Base-T, 100 Base-TX and 1,000 Base-T modes.

4. The line driver as claimed in claim 1, further comprising a load resistor disposed between a pair of output nodes and coupled in parallel with the current source.

5. The line driver as claimed in claim 4, wherein the sum of resistance of the first and second source resistors is equal to a resistance of the load resistor.

6. The line driver as claimed in claim 4, wherein the driving current flows through a transmission line to the load resistor and returns to the current source.

7. The line driver as claimed in claim 1, wherein no significant amount of the driving current flows through either of the first source resistor or the second source resistor.

8. The line driver as claimed in claim 1, wherein a resistance of the first source resistor is the same as a resistance of the second source resistor.

9. The line driver as claimed in claim 1, wherein at least one of the driving voltage or the driving current can be at any level between certain limits of a power supply.

10. The line driver as claimed in claim 4, wherein an output voltage between the pair of output nodes is at least partially determined by values of the driving voltage and the driving current, and a resistance of the load resistor.

11. A line driver, comprising:
 a current source having a first terminal and a second terminal;
 a first source resistor coupled to the first terminal of the current source; and
 a voltage source that, in series combination with the first source resistor, is coupled in parallel with the current source,
 wherein the current source provides a driving current and the voltage source provides a driving voltage at the same time, and wherein at least one of the driving voltage or the driving current is at a variable level between certain limits of a power supply.

12. The line driver as claimed in claim 11, further comprising a second source resistor coupled to the second terminal of the current source.

13. The line driver as claimed in claim 12, wherein the second source resistor is further coupled to the voltage source.

14. The line driver as claimed in claim 11, further comprising a load resistor disposed between a pair of output nodes and coupled in parallel with the current source.

15. The line driver as claimed in claim 11, wherein the driving current flows through a transmission line to the load resistor and returns to the current source, and wherein no driving current flows through the first source resistor.

16. The line driver as claimed in claim 14, wherein an output voltage between the pair of output nodes is at least partially determined by values of the driving voltage and the driving current, and a resistance of the load resistor.

17. A method for driving a system requiring multiple power sources, comprising:
 providing a current source, the current source having a first terminal and a second terminal providing a driving current;
 providing a first source resistor;
 coupling the first source resistor to the first terminal of the current source;
 providing a voltage source;
 coupling the voltage source to the current source such that the voltage source, in combination with the first source resistor, is coupled in parallel with the current source;
 providing a driving voltage; and
 providing both the driving voltage and the driving current during operation of the system, wherein at least one of the driving voltage or the driving current can be at any level between certain limits of a power supply.

18. The method as claimed in claim 17, further comprising providing a second source resistor and coupling the second source resistor to the second terminal of the current source.

19. The method as claimed in claim 18, further comprising providing a load resistor coupled in parallel with the current source, wherein the sum of resistance of the first and second source resistors is equal to a resistance of the load resistor.

20. The method as claimed in claim 19, wherein the driving current flows through a transmission line, to the load resistor and returns to the current source, and wherein no significant driving current flows through the first source resistor.

* * * * *